United States Patent
Geissbuehler et al.

(10) Patent No.: US 6,374,510 B1
(45) Date of Patent: Apr. 23, 2002

(54) DRIER-HEAT-EXCHANGER

(75) Inventors: Hans Geissbuehler, Zuzwil; Filippo Terrasi, Niederuzwil, both of (CH)

(73) Assignee: Buhler AG, Uzwil (CH)

( * ) Notice: Subject to any disclaimer, the term of this patent is extended or adjusted under 35 U.S.C. 154(b) by 0 days.

(21) Appl. No.: 09/509,686

(22) PCT Filed: Aug. 20, 1998

(86) PCT No.: PCT/CH98/00353

§ 371 Date: Jun. 13, 2000

§ 102(e) Date: Jun. 13, 2000

(87) PCT Pub. No.: WO99/18404

PCT Pub. Date: Apr. 15, 1999

(30) Foreign Application Priority Data

Oct. 1, 1997 (DE) .......................................... 197 43 461

(51) Int. Cl.$^7$ ................................................. F26B 19/00
(52) U.S. Cl. ..................... 34/232; 34/231; 34/174; 34/168
(58) Field of Search .................... 34/166, 167, 168, 34/174, 231, 232

(56) References Cited

U.S. PATENT DOCUMENTS

| | | | |
|---|---|---|---|
| 2,078,515 A | | 4/1937 | Sutherland |
| 2,474,199 A | | 6/1949 | Lechthaler et al. |
| 3,793,742 A | * | 2/1974 | Rainville et al. ............... 34/58 |
| 3,875,683 A | | 4/1975 | Waters |
| 3,896,562 A | * | 7/1975 | Zimmerman .................. 34/174 |
| 4,423,557 A | * | 1/1984 | Westelaken ..................... 34/56 |
| 4,839,969 A | * | 6/1989 | Hahn ........................... 34/169 |
| 4,914,834 A | * | 4/1990 | Sime ............................ 34/169 |
| 5,033,208 A | | 7/1991 | Ohno et al. |
| 5,467,535 A | * | 11/1995 | Lentz ........................... 34/168 |
| 5,992,044 A | * | 11/1999 | Hanig ........................... 34/434 |
| 6,202,319 B1 | * | 3/2001 | Bening ........................... 34/165 |

FOREIGN PATENT DOCUMENTS

| | | |
|---|---|---|
| CH | 314655 | 6/1956 |
| DE | 183963 | 4/1907 |
| DE | 1 735 075 | 11/1956 |
| DE | 1 067 372 | 10/1959 |
| DE | 1 802 182 | 12/1959 |
| DE | 1 604 812 | 1/1971 |
| DE | 1 951 641 | 3/1972 |
| DE | 24 44 034 | 4/1976 |
| DE | 27 53 543 | 6/1978 |
| DE | 271 813 | 9/1989 |
| DE | 290 841 | 6/1991 |
| DE | 92 11 730.9 | 2/1994 |
| DE | 43 00 913 | 7/1994 |
| EP | 0 124 294 | 11/1984 |
| FR | 867088 | 9/1941 |
| FR | 1429782 | 5/1966 |
| GB | 763879 | 12/1956 |

* cited by examiner

Primary Examiner—Pamela Wilson
(74) Attorney, Agent, or Firm—Finnegan, Henderson, Farabow, Garrett & Dunner, L.L.P.

(57) ABSTRACT

The invention relates to a drier-heat-exchanger for heat treating PET granulate and similar products. The drier has a channel which is delimited by air permeable sheets. This ensures that the product can pass through efficiently and evenly which in turn means that a higher gas speed can be used without the product being stirred up and therefore shorter heating times are possible.

11 Claims, 3 Drawing Sheets

DRIER-HEAT-EXCHANGER

Figure 1:
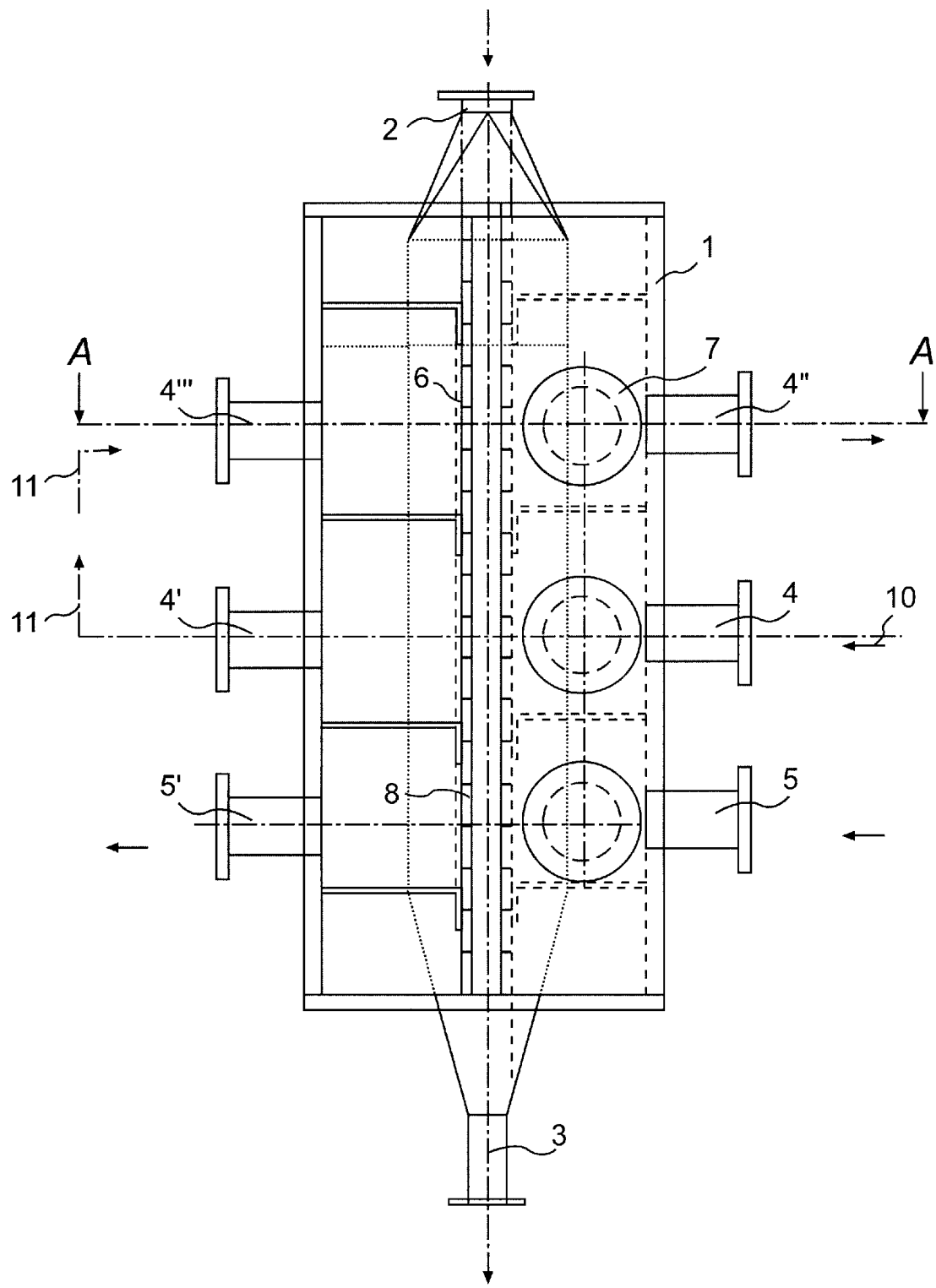

The invention relates to a dryer or heat exchanger for drying or SSP pre-treatment (heating without adhesion) of PET granulate or PA or PEN granulate. It can also be used for drying other granular bulk materials.

Methods and devices for crystallising and aftercondensing PET in solid phase are well known. Aftercondensing of PET in solid phase (SSP) occurs at temperatures exceeding 200° C. for several hours in suitable reactors or dryers. The problem consists of achieving the highest possible throughput and quality of material at minimal expenditure. The process applied inter alia uses even heating of the PET and at the same time removes reaction products.

The use of roof dryers or column dryers for SSP treatment of PET granulates is well known. Thus DE-A-4300913 describes a pre-heater with roof-shaped baffles to achieve an even gas flow in the reverse flow. At the same time the baffles are also designed to achieve an evening out of the product flow (relative movement and prevention of sticking) as well as a reduction of the bulk pressure. Also known are shaft reactors with net-like baffles (DE-C-2753543) among others. The manufacturing expense for such baffles is high.

CH-PS 314655 describes a device for de-dusting and classifying granular materials, with the product falling down being evenly de-dusted by means of an ascending airstream. The air enters the device laterally beside or below a displacer.

Also known are dryers for nuts, cocoa beans and similar which essentially comprise an upper section with two heating zones and a lower section with cooling zones.

The product passes the dryer/roaster from top to bottom in a narrow channel whose longitudinal sides comprise grates covered by wire mesh. The width of the channel is adjustable and the grating is removable. The small design is a disadvantage as it does not allow large throughput with long dwell time. From the point of view of process technology, simple upscaling is not possible. Such a dryer/roaster is air-operated and not airtight. With the products to be treated, the problem of agglomeration does not arise; in addition the products are comparatively large and their bulk density is low.

It is thus the object of the invention to improve the above-mentioned state of the art by developing a dryer for granulate, in particular of PET, PEN or PA for their thermal pre-treatment, which dryer makes possible a bulk flow with short to extended dwell time and large design height.

This object is met in that in a dryer which in itself is of conventional design and comprises a circular or rectangular cross-section, a channel is arranged whose side walls are elements such as perforated panels or similar. The width of the channel is preferably 25 to 40 cm at a length of up to approx. 3.5 m and a height of up to or exceeding 15 m. A displacer and/or deflection elements may be arranged in the lower region of the channel.

This makes it possible to achieve a high gas throughput without easing off and thus a short heat-up time, combined with a compact and economical design size.

It is necessary to achieve a finely distributed gas flow, i.e. a good through flow of the product with compartmentalised gasification (cross-flow, inverse flow) against the product stream. Dwell time of the products is usually 1–2 hours. To achieve a good flow through the product, including a relatively large to minor loss in air pressure, the holes in the perforated panels have a nominal diameter of only a few millimeters. Alternatively, instead of using actual perforated panels, panels with fine, slot-shaped apertures (covering the channel surface entirely or partly) are used.

The outer casing is rectangular or round (resistance to pressure hammer; maintenance considerations). Further baffles parallel to the gas flow can be arranged in the channel, e.g. panels alternately pointing downwards, to prevent the granulate from sticking due to lack of movement.

Figure 2:
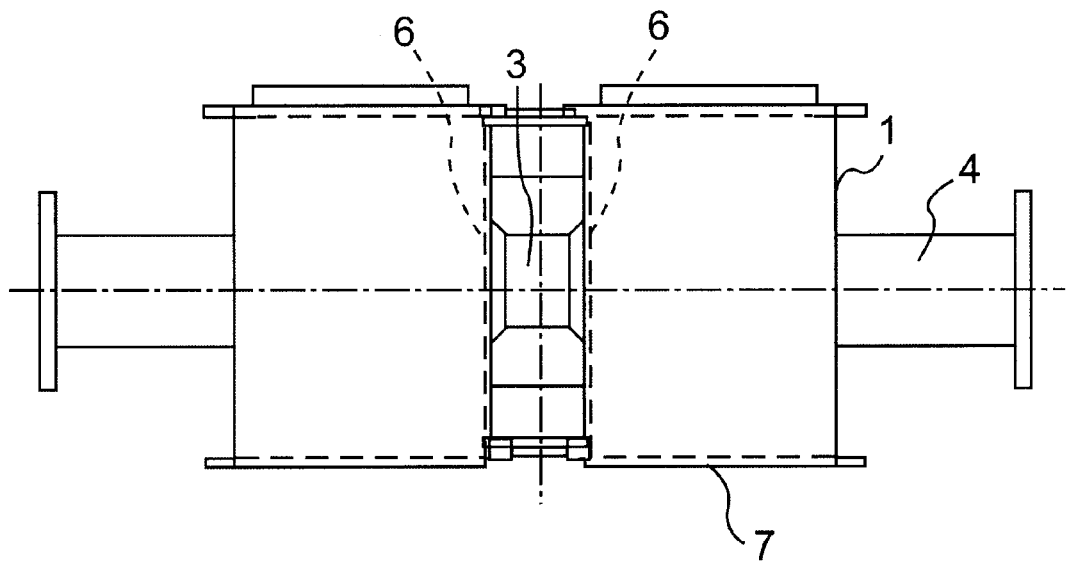
Figure 3:
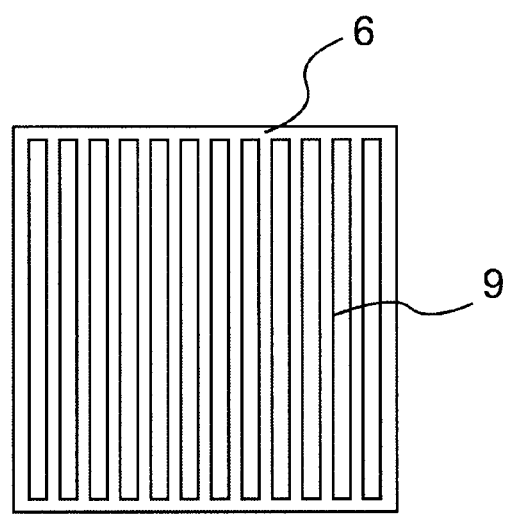
Figure 4:
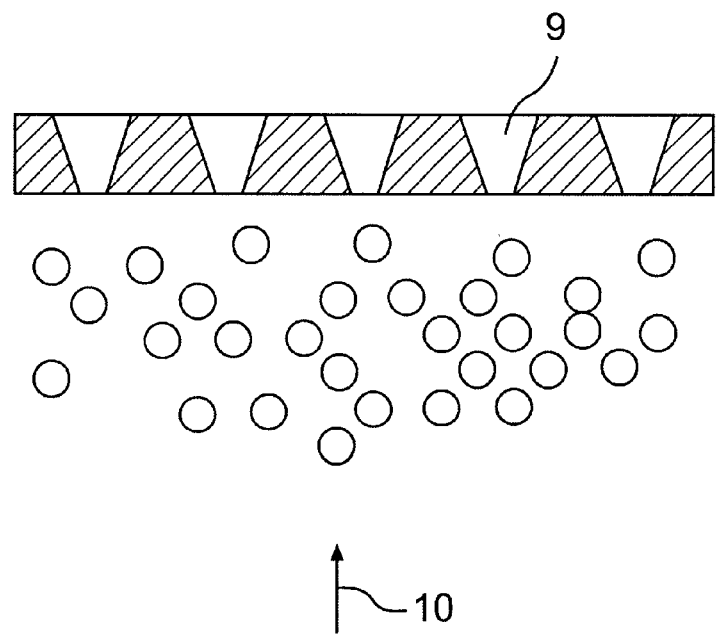
Figure 5:
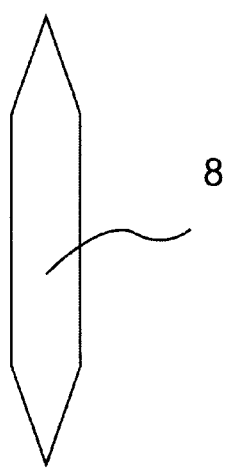

Below, one exemplary embodiment of the invention is described by means of a drawing in which the following are shown:

FIG. 1: a longitudinal section of the dryer
FIG. 2: a sectional view according to FIG. 1
FIG. 3: the channel wall
FIG. 4: a cross-section of the channel wall
FIG. 5: an embodiment of an obstacle (baffles) in the channel The dryer/heat exchanger comprises a rectangular housing 1 with a product inlet 2 and a product outlet 3 as well as connection pieces 4 and 5 for the inlet and outlet of heating gas and cooling gas.

On the inside between product inlet 2 and product outlet 3 there is a channel for treating the product.

This channel comprises air-permeable panels 6 extending across the entire width of the housing 1, thus delimiting the channel. If required, these panels 6 can be arranged in a flexible way to allow variation of the channel width. Preferably these panels 6 are different for gas entry and gas outlet, depending on the task of gas distribution or avoiding blockages due to dust. In the direction of product flow in the channel, the panels also comprise obstacles in the form of corrugated or knife-shaped baffles 8 and/or the panels 6 can be corrugated themselves. In the direction of product flow, the panels 6 themselves also comprise apertures 9 (holes, slots or grids) through which process gas and dust particles and similar can issue without hindrance. At the same time these apertures 9 are dimensioned such that coarser particles e.g. angel's hair cannot pass and that self-cleaning of the apertures 9 takes place by means of the granulate. Any soiling of the apertures 9 is reliably prevented, e.g. by a conical design of the apertures 9.

The product, e.g. a PET granulate, passes through the product inlet 2 into the channel delimited by the panels 6 and slowly passes through this channel in the direction of the product outlet 3. Heating gas 10, e.g. $N_2$ enters the channel through the apertures 9 of the panels 6 and flows through the granulate in cross-flow or reverse flow. By way of the flow-connected recirculation connection pieces 4' and 4''', the heating gas 10 can circulate in the entire region of the channel. The flow-connection between connection pieces 4' and 4''' is depicted schematically in FIG. 1 by arrows 11. Through the connection piece 4" spent heating gas 10 can exit and can cycle in the known way. A cooling gas can enter through connecting piece 5 and in an analogous way stream through the granulate and leave the dryer through the connecting piece 5'.

A fast gas flow is achieved without whirling up the product. This results in short heating times or a high product throughput. Process management of drying/aftercondensing and cooling takes place in the generally known manner concerning temperature management and dwell time of the granulate in the channel.

The process can be monitored by way of sight glasses/service apertures 7.

The granulate made of PET, PEN, PA or similar is a homogenous starting material with few impurities and is not agglomerated. After treatment in the dryer this granulate is crystallised comprising a bulk density increased by 2–5% as well as comprising homogenous granulate shape. Temperature distribution is homogenous and any low melting points are no longer evident.

This was achieved by an alternating flow (cross-flow or reverse flow) of the heating gas 10 through the product, in a narrow product column with low bulk pressure. The latter is supported by the baffles 8. By way of pressure loss of the heating gas, the comparatively fine apertures 9 of the panels 6 achieve good gas distribution at the channel walls.

LEGEND

1 Housing
2 Product inlet
3 Product outlet
4 Connecting piece
4' Connecting piece
4" Connecting piece
5' Connecting piece
5" Connecting piece
6 Panel
7 Sight glass/service aperture
8 Baffles
9 Apertures
10 Heating gas

What is claimed is:

1. A dryer for thermal treatment of granular product with process gas, comprising a housing with a product inlet and a product outlet, connection pieces for admitting and discharging process gas to the housing, and an air-permeable channel for treatment of the product, the channel being in flow communication with both the product inlet and the product outlet and with the connection pieces, wherein the channel is delimited by elements having apertures, with the size of the apertures being smaller than a particle dimension of the product, and wherein obstacles in the form of baffles are arranged in the channel to oppose product flow.

2. The dryer according to claim 1, wherein the elements are panels whose apertures are hole-shaped or slot-shaped.

3. The dryer according to claim 2, wherein the panels have opposed sides and a thickness and wherein the apertures are slot-shaped and tapered in width in the panel thickness direction, with the width of the aperture on the side of the panel in contact with the product being smaller than on the side of the panel facing away from the product.

4. The dryer according to claim 1, wherein a cross-section of the channel comprises a shape selected from the group consisting of slot-shape, square shape, and ring-shape.

5. The dryer according to claim 1, wherein a static distributor is arranged in the region of the product inlet.

6. The dryer according to claim 1, wherein the apertures are slot-shaped and arranged in the direction of product flow.

7. The dryer according to claim 1, having a plurality of inlet connection pieces and outlet connection pieces, and wherein at least one inlet connection piece is flow connected to at least one outlet connection piece to provide recirculation of the process gas in the channel.

8. The dryer according to claim 1, wherein the baffles have leading edges oriented to oppose the granulate flow in the channel, and wherein the leading edges have shapes selected from the group consisting of knife-shaped and corrugated.

9. The dryer according to claim 2, wherein the panels are parallel.

10. The dryer according to claim 1, wherein the elements provide process gas flow in a cross-flow direction relative to a flow direction of the product.

11. The dryer according to claim 1, wherein the elements provide process gas flow in a reverse direction relative to a flow direction of the product.

* * * * *